United States Patent
Dalmatov et al.

(10) Patent No.: US 10,289,566 B1
(45) Date of Patent: May 14, 2019

(54) HANDLING DATA THAT HAS BECOME INACTIVE WITHIN STREAM AWARE DATA STORAGE EQUIPMENT

(71) Applicant: EMC IP Holding Company LLC, Hopkinton, MA (US)

(72) Inventors: Nickolay Alexandrovich Dalmatov, Saint Petersburg (RU); Richard P. Ruef, Santa Cruz, CA (US); Kurt W. Everson, Missouri City, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/662,669

(22) Filed: Jul. 28, 2017

(51) Int. Cl.
| | |
|---|---|
| *G06F 12/10* | (2016.01) |
| *G06F 12/128* | (2016.01) |
| *G06F 12/123* | (2016.01) |
| *G06F 12/122* | (2016.01) |
| *G06F 12/02* | (2006.01) |
| *G06F 16/00* | (2019.01) |

(52) U.S. Cl.
CPC ........ *G06F 12/128* (2013.01); *G06F 12/0253* (2013.01); *G06F 12/122* (2013.01); *G06F 12/123* (2013.01); *G06F 16/00* (2019.01)

(58) Field of Classification Search
CPC .......................... G06F 12/128; G06F 12/0253
USPC ......................................................... 711/133
See application file for complete search history.

(56) References Cited

U.S. PATENT DOCUMENTS

| | | | |
|---|---|---|---|
| 8,712,978 B1 | 4/2014 | Shilane et al. | |
| 9,201,891 B2 | 12/2015 | Romanski et al. | |
| 9,256,368 B2 | 2/2016 | Welnicki et al. | |
| 2001/0042074 A1* | 11/2001 | Kawamoto | ......... G06F 12/0253 |

* cited by examiner

*Primary Examiner* — Jae U Yu
(74) *Attorney, Agent, or Firm* — BainwoodHuang

(57) ABSTRACT

A technique involves, from an incoming flow of data that includes a first stream from a first source and another stream from another source, placing data of the first stream into first storage segments and data of the other stream into other storage segments that are different from the first storage segments. The technique further involves, while some of the data of the first stream becomes invalidated over time and while a garbage collection service consolidates remaining valid data of the first stream together within the first segments, tracking the number of times the remaining valid data of the first stream is consolidated together within the first segments by the garbage collection service. The technique further involves comingling (i) remaining valid data of the first stream which has been consolidated together a predefined number of times within the first segments with (ii) the data of the other stream.

20 Claims, 10 Drawing Sheets

HANDLING DATA THAT HAS BECOME INACTIVE WITHIN STREAM AWARE DATA STORAGE EQUIPMENT

BACKGROUND

A conventional data storage system processes input/output (I/O) requests from one or more external host computers. In particular, the conventional data storage system writes host data to and reads host data from an array of storage drives.

For example, a human operator may run accounting software to generate and store an accounting report on the array. Concurrently, a different human operator may use word processing software to edit a document that is stored on the array.

SUMMARY

It should be understood that there are deficiencies to the above-described conventional data storage system. For example, the accounting report generated by the accounting software and the document provided by the word processing software are unrelated to each other. Moreover, it may only be coincidental if the accounting report and the document are accessed at the same time in the future. Nevertheless, the above-described conventional data storage system will likely store accounting report and the document together in the array (e.g., within the same segment, etc.) if the system receives the data from both sources at the same time. Furthermore, if a garbage collection service runs on the system, the garbage collection service may further mix the data of the accounting report and the document together on the system.

Unfortunately, such mixing of data from different sources may lead to suboptimal operation of the system. Along these lines, the data for the accounting report may be more fragmented and thus read less sequentially due to intermixing with the document data and vice versa. Additionally, such fragmenting and intermixing may cause write amplification on solid state drives (SSDs).

In contrast to the above-described conventional data storage system which may mix together data from different sources, improved techniques are directed to stream-based storage of data in which data placement operations are performed based on detection of different data streams within an incoming flow of data. Such operation enables the data of each data stream to be placed in a different segment of storage provided by a data storage array (e.g., where each segment is formed by multiple storage devices). Since the data from each source is kept together, the resulting operation is more efficient, e.g., optimized sequential reads and writes, improved data prefetching, improved auto-tiering of data, and so on. Moreover, data that has not been accessed for some period of time, which may be referred to as inactive data (e.g., garbage collected a certain number of times, not recently accessed or read, etc.), may be considered cold and thus moved elsewhere (e.g., to a dedicated or default stream) to reduce overhead.

One embodiment is directed to a method of performing stream-based storage of data. The method includes, from an incoming flow of data that includes a first data stream from a first data stream source and another data stream from another data stream source, placing data of the first data stream into first storage segments and data of the other data stream into other storage segments that are different from the first storage segments. The method further includes, while some of the data of the first data stream becomes invalidated over time and while a garbage collection service consolidates remaining valid data of the first data stream together within the first storage segments, tracking the number of times the remaining valid data of the first data stream is consolidated together within the first storage segments by the garbage collection service. The method further includes comingling (i) remaining valid data of the first data stream which has been consolidated together a predefined number of times within the first storage segments with (ii) the data of the other data stream within the other storage segments that are different from the first storage segments. Accordingly, as valid data becomes inactive, that valid data may be demoted to less expensive storage and no longer placed based on stream awareness to save overhead.

In some arrangements, tracking the number of times the remaining valid data of the first data stream is consolidated together within the first storage segments by the garbage collection service includes updating counter entries within an active data tracking database. In these arrangements, the counter entries identify the number of times the remaining valid data of the first data stream has been consolidated together by the garbage collection service.

In some arrangements, the method further includes, while some of the data of the other data stream becomes invalidated over time and while the garbage collection service consolidates remaining valid data of the other data stream together within the other storage segments, updating other counter entries within the active data tracking database. In these arrangements, the other counter entries identify the number of times the remaining valid data of the other data stream has been consolidated together by the garbage collection service.

In some arrangements, the other storage segments includes second storage segments that are different from the first storage segments. Here, the data of the other data stream that is placed into the other storage segments includes data of a second data stream that is placed into the second storage segments that are different from the first storage segments. Additionally, comingling the remaining valid data of the first data stream with the data of the other data stream within the other storage segments includes combining the remaining valid data of the first data stream which has been consolidated together the predefined number of times within the first storage segments with remaining valid data of the second data stream which has been consolidated together at least the predefined number of times within the second storage segments.

In some arrangements, the first data stream and the second data stream are initially interleaved within the incoming flow of data. In these arrangements, combining includes coalescing blocks of the first data stream with blocks of the second data stream within third storage segments that are different from the first storage segments and the second storage segments. Along these lines, the first storage segments may reside in a first storage tier, and the third storage segments may reside in a second storage tier that provides slower data access than that of the first storage tier.

Alternatively, combining includes coalescing blocks of the first data stream with blocks of the second data stream within the second storage segments that are different from the first storage segments. Here, the first storage segments may reside in a first storage tier, and the second storage segments may reside in a second storage tier that provides slower data access than that of the first storage tier.

In some arrangements, the method further includes, in response to comingling the remaining valid data of the first data stream which has been consolidated together the predefined number of times with the data of the other data stream within the other storage segments, deleting particular counter entries from the active data tracking database. Here, the particular counter entries have counted the number of times that the remaining valid data of the first data stream had been consolidated together.

In some arrangements, comingling the remaining valid data of the first data stream which has been consolidated together the predefined number of times with the data of the other data stream within the other storage segments includes moving the remaining valid data of the first data stream which has been consolidated together the predefined number of times from faster storage within secondary memory to slower storage within secondary memory. That is, as this remaining valid data become less active (but still valid), such data is demoted to a slower tier and the overhead for placing that data based on streams is no longer provided.

In some arrangements, the method further includes identifying, from the remaining valid data of the first data stream, hotter data which has been read within a predefined amount of time and colder data which has not been read within the predefined amount of time. In these arrangements, comingling the remaining valid data of the first data stream which has been consolidated together the predefined number of times with the data of the other data stream includes combining the colder data with the data of the other data stream while deferring combining the hotter data with the data of the other data stream.

In some arrangements, the data storage equipment is operative to store data within tiered storage. In these arrangements, remaining valid data of the first data stream which has been consolidated together less than the predefined number of times resides within a first storage tier of the tiered storage. Additionally, the hotter data resides within a second storage tier of the tiered storage, the second storage tier providing slower data access than the first storage tier. Furthermore, the colder data resides within a third storage tier of the tiered storage, the third storage tier providing slower data access than the second storage tier.

Another embodiment is directed to data storage equipment which includes a communications interface, memory, and control circuitry coupled to the communications interface and the memory. The memory stores instructions which, when carried out by the control circuitry, cause the control circuitry to:

(A) from an incoming flow of data received through the communications interface that includes a first data stream from a first data stream source and another data stream from another data stream source, place data of the first data stream into first storage segments and data of the other data stream into other storage segments that are different from the first storage segments, (B) while some of the data of the first data stream becomes invalidated over time and while a garbage collection service consolidates remaining valid data of the first data stream together within the first storage segments, track the number of times the remaining valid data of the first data stream is consolidated together within the first storage segments by the garbage collection service, and (C) comingle (e.g., combine or mix) (i) remaining valid data of the first data stream which has been consolidated together a predefined number of times within the first storage segments with (ii) the data of the other data stream within the other storage segments that are different from the first storage segments.

Yet another embodiment is directed to a computer program product having a non-transitory computer readable medium which stores a set of instructions to perform stream-based storage of data. The set of instructions, when carried out by computerized circuitry, causes the computerized circuitry to perform a method of:

(A) from an incoming flow of data that includes a first data stream from a first data stream source and another data stream from another data stream source, placing data of the first data stream into first storage segments and data of the other data stream into other storage segments that are different from the first storage segments;

(B) while some of the data of the first data stream becomes invalidated over time and while a garbage collection service consolidates remaining valid data of the first data stream together within the first storage segments, tracking the number of times the remaining valid data of the first data stream is consolidated together within the first storage segments by the garbage collection service; and (C) comingling (i) remaining valid data of the first data stream which has been consolidated together a predefined number of times within the first storage segments with (ii) the data of the other data stream within the other storage segments that are different from the first storage segments.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in handling data that has become inactive within a stream aware data storage system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to stream-based storage of data in which data placement operations are performed based on detection of different data streams within an incoming flow of data. Such operation enables the data of each data stream to be placed in a different segment of storage provided by a data storage array (e.g., where each segment is formed by multiple storage devices). Since the data from each source is kept together, the resulting operation is more efficient, e.g., optimized sequential reads and writes, improved data prefetching, improved auto-tiering of data, and so on. Moreover, data that has not been accessed for some period of time which may be referred to as inactive data (e.g., garbage collected a certain number of times, not recently accessed, etc.) may be considered cold and thus moved elsewhere (e.g., to a dedicated or default stream) to reduce overhead.

Figure 1:
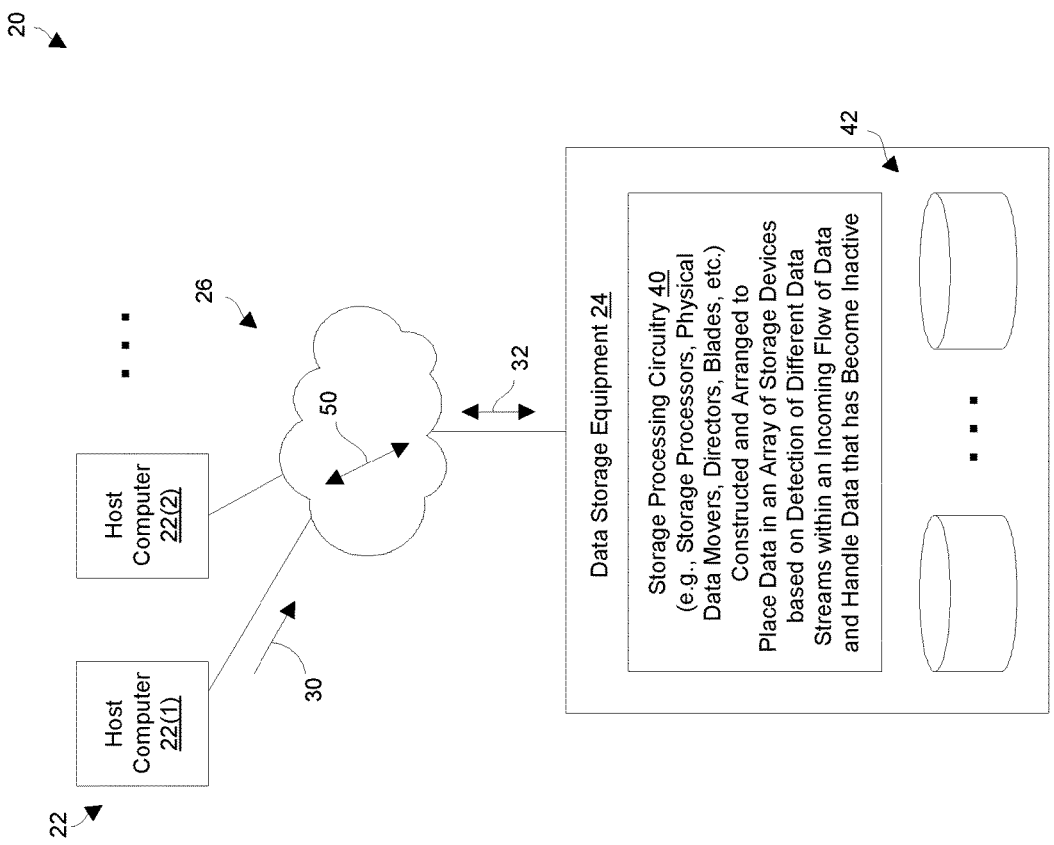
FIG. 1 is a block diagram of a data storage environment which places data based on detection of different data streams within an incoming flow of data.

FIG. 1 is a block diagram of a data storage environment 20 which places data in secondary storage based on detection of different data streams (i.e., electronic stream awareness) within an incoming flow of data and handles data that has become inactive in a different manner. The data storage environment 20 includes a set of host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, combinations thereof, and so on, which provides I/O requests 30 (e.g., small computer system interface or SCSI commands) to the data storage equipment 24. Such I/O requests 30 direct the data storage equipment 24 to store and retrieve host data 32 on behalf of the host computers 22.

The data storage equipment 24 includes storage processing circuitry 40 and an array of storage devices 42. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 responds to the I/O requests 30 from the host computers 22 by robustly and reliably storing the host data 32 into and retrieving the host data 32 from the array of storage devices 42. To this end, the storage processing circuitry 40 performs data placement operations that places data within the array of storage devices 42 based on detection of different data streams within an incoming flow of data. Accordingly, the data storage equipment 24 is able to enjoy certain efficiencies and optimizations such as performing improved sequential read and write operations, better prefetching of data, smarter auto-tiering of data, and reducing write amplification within the array of storage devices 42.

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 stores host data 32 to the array of storage devices 42 and loads host data 32 from the array of storage devices 42 in response to the I/O requests 30. While doing so, the storage processing circuitry 40 detects different data streams within an incoming flow of data and performs data placement operations based on such detection. In particular, the storage processing circuitry 40 places the data of each data stream in a different segment (or predefined area) of secondary storage provided by the array of storage devices 42.

Additionally, for data that has not been accessed for some period of time, the storage processing circuitry 40 may treat that data as being inactive and/or ready for archiving. For such data, the storage processing circuitry 40 no longer performs data placement based on streams but instead handles that data as general or default data that does not belong to a particular stream or perhaps that belongs to a dedicated (default) stream of general data.

In some arrangements, at least a portion of the array of storage devices 42 provides log-based storage. That is, the storage devices 42 provide a non-volatile storage structure called a log which is divided into a series of segments of equal size. When the storage processing circuitry 40 receives enough data to write a full segment, the storage processing circuitry 40 writes that data into the next unoccupied segment. If any portion of that data had been written to an earlier-written segment, the storage processing circuitry 40 invalidates that portion of data in the earlier-written segment.

In these arrangements, the storage processing circuitry 40 provides a garbage collection service that combines or consolidates remaining valid blocks of data from partially-used segments and stores that data in new segments. Accordingly, the partially-used segments are then available for reuse.

Additionally, in some arrangements, the storage processing circuitry 40 provides a deduplication service which attempts to eliminate duplicate copies of the same data by storing a single instance of that data within array of storage devices 42. To this end, the storage processing circuitry 40 generates a digest of each data block (e.g., by applying a hash function to the data) and then, based on comparing digests, looks for matches that may signifying multiple copies of the same data. If copies of the same data are found (e.g., via a subsequent bit-by-bit comparison), the storage processing circuitry 40 eliminates the unnecessary copies and replaces them with references to the remaining copy thus saving storage space.

In some embodiments, the storage processing circuitry 40 distinguishes the digests that are generated by the storage processing circuitry 40 from other data and keeps them grouped together for efficient future access. Such grouping can be based on time (e.g., when the digests were created/stored, when the data corresponding to the digests were received, etc.) and/or based on stream (e.g., which stream does the data and thus the digests belong to, etc.). Accordingly, deduplication operations are more efficient in that the searches for matching digests is performed among a smaller (or tighter) group of digests.

It should be understood that after certain data for a particular stream has become less active (e.g., due to fewer reads, due to being garbage collected a predefined number of times, etc.), the storage processing circuitry 40 may no longer place that data in the same segments assigned to the particular stream. Rather, the storage processing circuitry 40 may deem that data as belonging to a general or default stream that is stored in default segments or simply disregard placing that data within segments based on stream. Instead, the storage processing circuitry 40 allows that data to mingle with other data. Such operation is an improvement to the technology since overhead resources that performed placement based on the data belonging to the particular stream may now be redirected to perform other useful work. Further details will now be provided with reference to FIG. 2.

Figure 2:
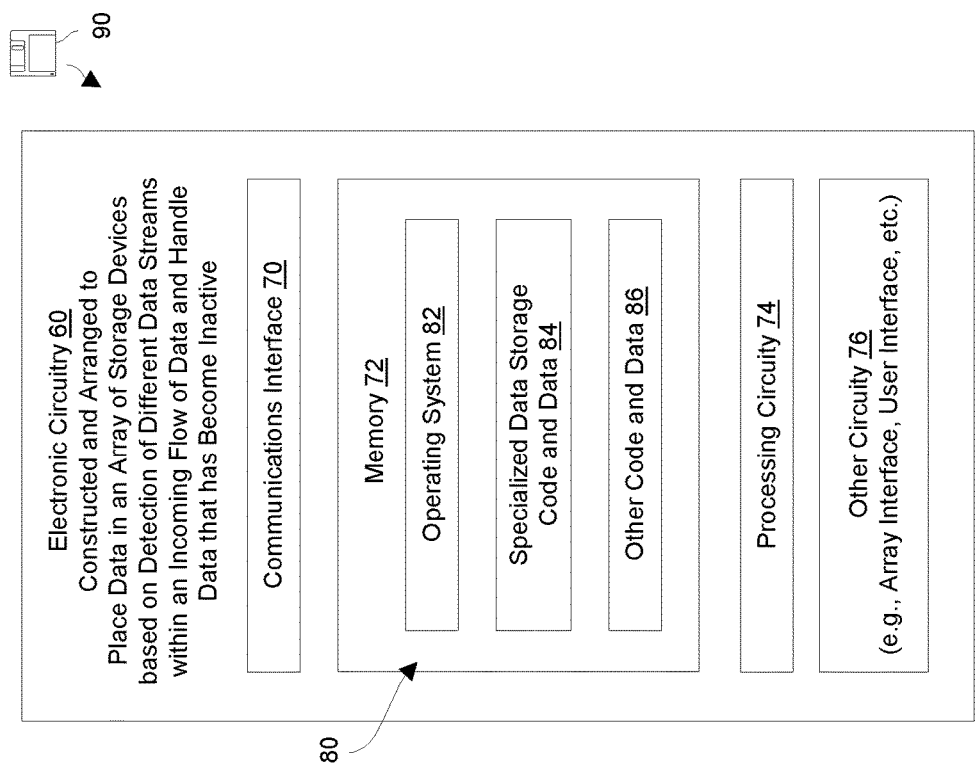
FIG. 2 is a block diagram of data storage equipment of the data storage environment of FIG. 1.

FIG. 2 shows particular details of electronic circuitry 60 which forms the storage processing circuitry 40 of the data storage equipment 24 (also see FIG. 1) that places data based on detection of different data streams in accordance with certain embodiments. As shown, the electronic circuitry 60 includes a communications interface 70, memory 72, and processing circuitry 74, and other circuitry 76.

The communications interface 70 is constructed and arranged to connect the data storage equipment 24 to the communications medium 26 (also see FIG. 1) to enable electronic communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the array of storage devices 42 (FIG. 1). The memory 72 stores a variety of software constructs 80 including operating system code 82, specialized data storage code and data 84, as well as other code and data 86.

The operating system code 82 refers to an operating system which is involved in controlling various electronic resources of the data storage equipment 24. Along these lines, the operating system manages/allocates various electronic resources such as processor cycles, memory space, application installations, access control and privileges, and so on.

The specialized data storage code and data 84 refers to the instructions that are involved in routine data storage operations (e.g., write and read operations). The specialized data storage code 84 may include operating parameters, drivers, other metadata, etc. that form one or more portions of the I/O stack, mapping tables, and so on. In some arrangements, the specialized data storage code 84 is tightly integrated with the operating system code 82 (e.g., a kernel).

Additionally, the specialized data storage code and data 84 refers to specialized instructions that provides other services such as a deduplication service which is constructed and operative to share duplicates of data, and a garbage collection service that coalesces valid data from partially utilized segments of storage to free up those segments of storage for reuse. In some arrangements, the specialized data storage code and data 84 further includes an index of digests that uniquely identify portions of the data (e.g., data blocks) for deduplication.

The other code and data 86 refers to various other instructions, parameters, data, etc. For example, the data storage equipment 24 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations with smart data placement based on detection of different data streams, performs deduplication of data, performs garbage collection, and so on.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 (or perhaps the communications interface 70) includes circuitry that operates as a storage drive (or array) interface to communicate with the storage drives 42 (e.g., SATA, SAS, PCIe, etc.). As another example, the other circuitry 76 may include a user terminal or service processor that enables a human user to control and/or configure the data storage equipment 24, and so on. Further details will now be provided with reference to FIGS. 3 through 5.

Figure 3:
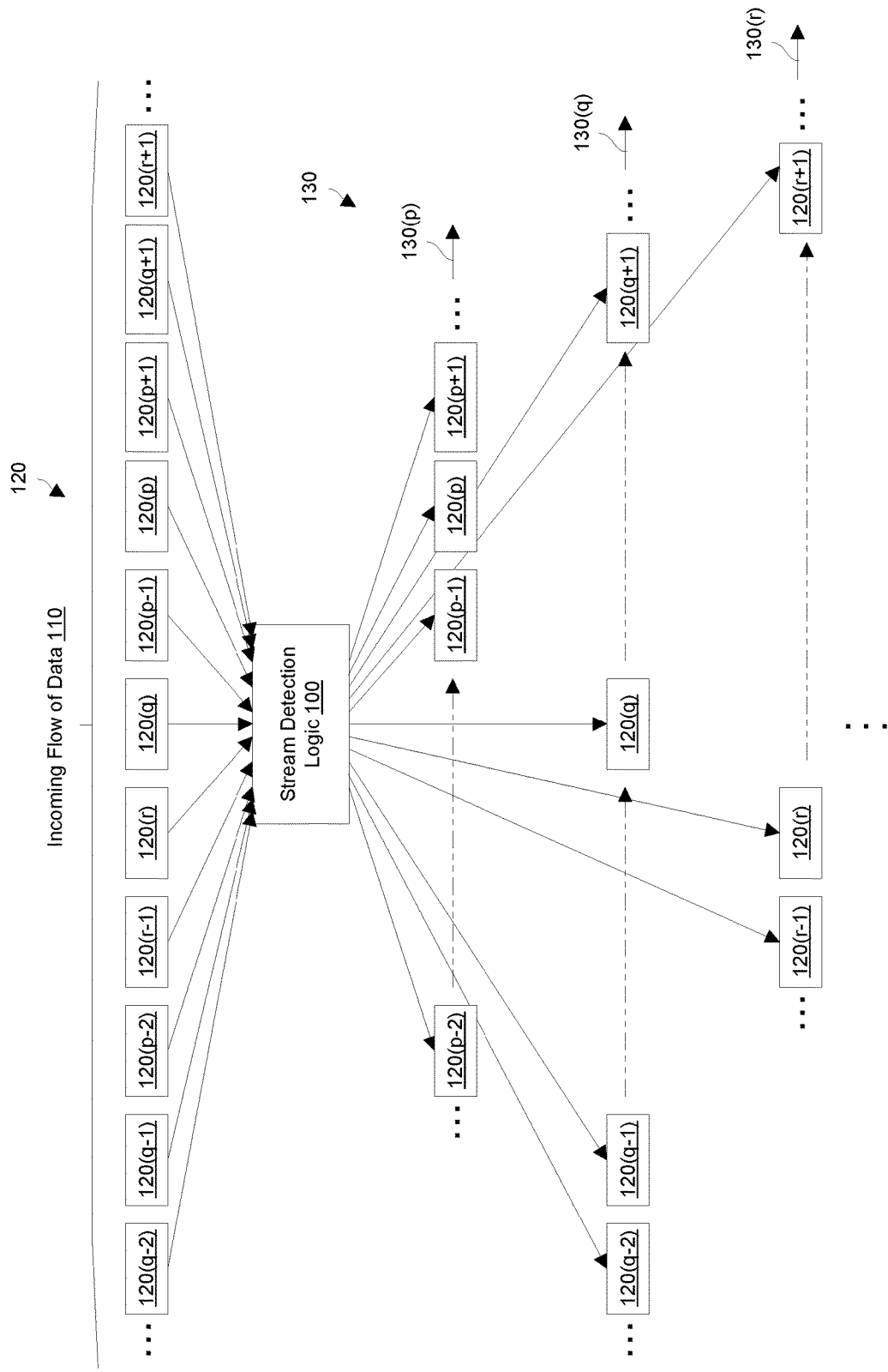
FIG. 3 is a block diagram illustrating particular details of the data placement processes in accordance with certain embodiments.
Figure 4:
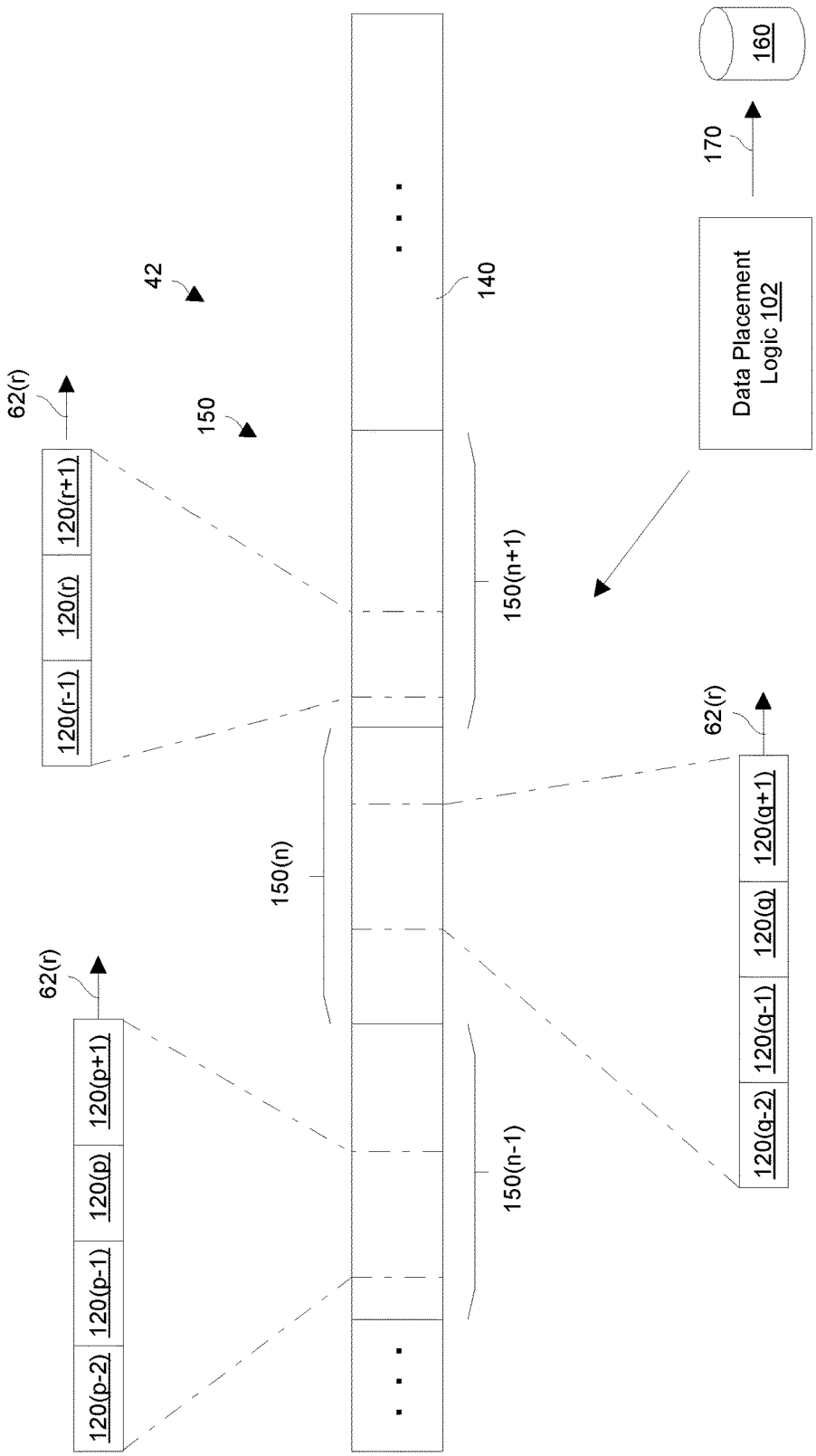
FIG. 4 is a block diagram illustrating further details of the data placement processes in accordance with certain embodiments.
Figure 5:
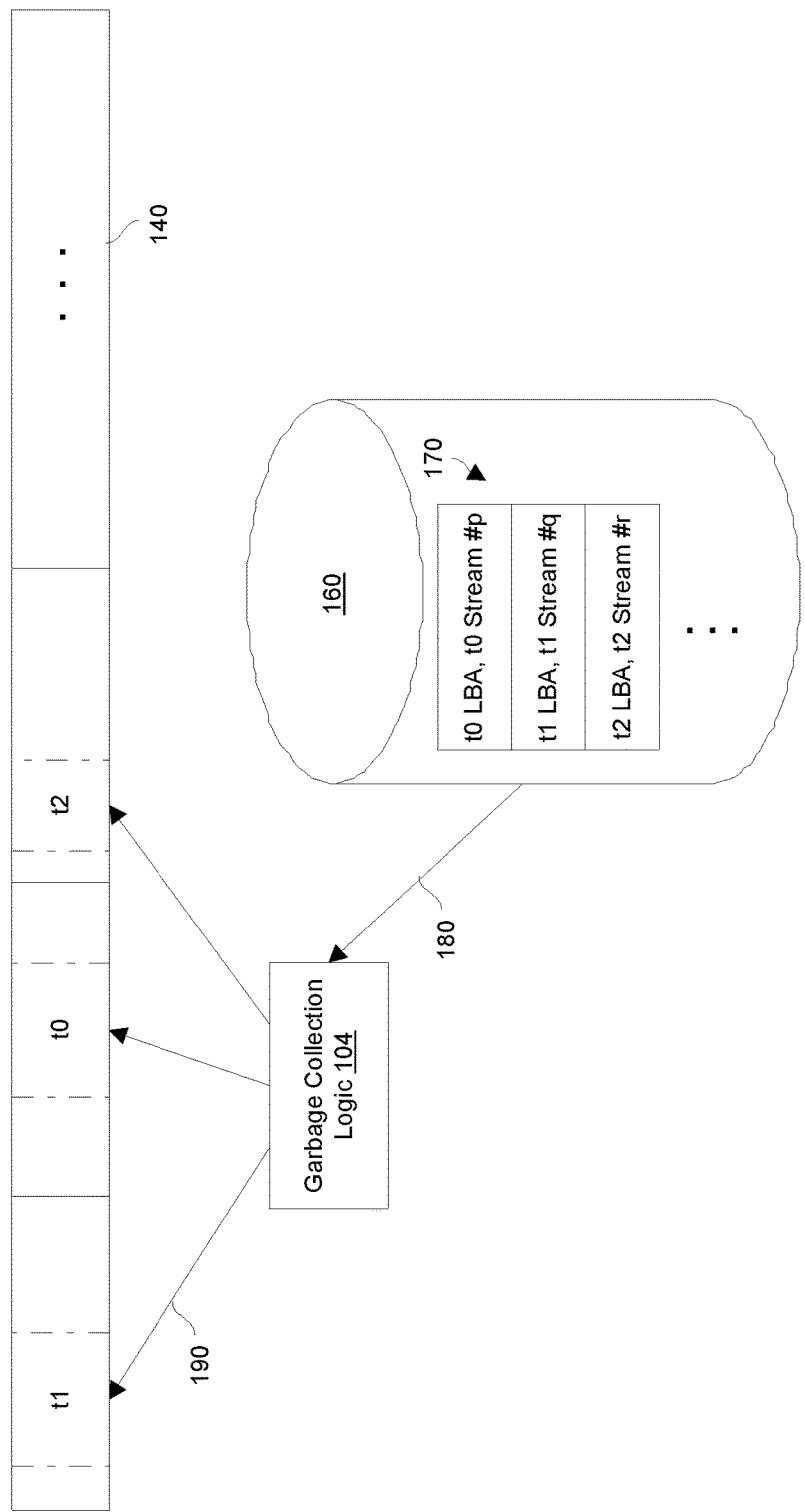
FIG. 5 is a block diagram illustrating yet further details of the data placement processes in accordance with certain embodiments.

FIGS. 3 through 5 show particular details of a data placement process as performed by the storage processing circuitry 40 (also see FIG. 1) in accordance with certain embodiments. FIG. 3 shows stream detection which is performed by stream detection logic 100 in accordance with certain embodiments. FIG. 4 shows data placement which is performed by data placement logic 102 in accordance with certain embodiments. FIG. 5 shows garbage collection activity which is performed by garbage collection logic 104 in accordance with certain embodiments. It should be understood that, in some embodiments, such logic 100, 102, and 104 may be formed by the processing circuitry 74 operating in accordance with the specialized data storage code and data 84 (also see FIG. 2).

As diagrammatically shown in FIG. 3, the stream detection logic 100 evaluates an incoming flow of data 110. In particular, the incoming flow of data 110 includes a series of data blocks 120. In some arrangements, the size of each data block 120 is the same (e.g., 8 KB, 16 KB, 32 KB, 64 KB, etc.). In other arrangements, each data block 120 may be variable in size.

During evaluation of the incoming flow of data 110, the stream detection logic 100 may detect the presence of different data streams 130(p), 130(q), 130(r), . . . (collectively, data streams 130) within the incoming flow of data 110. Such operation involves identification of particular consistencies among groups of data blocks 120. Along these lines, different groups of data blocks 120 may be provided by different sources. For example, some data blocks 120 may originate from a first host computer application such as accounting software, while other data blocks 120 may originate from a second host computer application such as a word processor, and yet other data blocks 120 may originate from a third host computer application such as a database, and so on. As another example, some data blocks 120 may be provided by a first user, other data blocks 120 may be provided by a second user, and so on. As yet another example, some data blocks 120 may arrive over a first path (or connection, or port number, etc.), other data blocks 120 may arrive over a second path, etc. Other stream distinguishing criteria may be used as well as such as the type of data (e.g., regular data vs. a digest for deduplication, etc.), the format of the data, the size of the data, combinations thereof, and so on.

When the stream detection logic 100 determines that a particular data block 120 belongs to a particular data stream 130, the stream detection logic 100 may assign a unique stream identifier (ID) to that data block 120 to indicate that the data block 120 belongs to that data stream 130. In some embodiments, if the stream detection logic 100 cannot determine which stream 130 a particular data block 120 belongs to or if the stream detection logic 100 concludes that the data block 120 does not belong to any stream 130, the stream detection logic 100 either leaves the data block 120 unidentified or identifies that block 120 as belonging to a general (or default) stream 130 of data.

By way of example and as shown in FIG. 3, the stream detection logic 100 identifies blocks . . . , 120(p-2), 120(p-1), 120(p), and 120(p+1), . . . of the incoming flow of data 110 as belonging to data stream 130(p). Likewise, the stream detection logic 100 identifies blocks . . . , 120(q-2), 120(q-1), 120(q), and 120(q+1), . . . as belonging to data stream 130(q). Similarly, the stream detection logic 100 identifies blocks . . . , 120(r-1), 120(r), and 120(r+1), . . . as belonging to data stream 130(r), and so on.

Next and as shown in FIG. 4, the data placement logic 102 stores the various blocks 120 of data within non-volatile secondary storage 140 provided by the array of storage devices 42. In particular, the data placement logic 102 places the respective blocks 120 of each data stream 130 in different segments (or groups of locations) 150 of the secondary storage 140 (e.g., based on assigned stream IDs). Along these lines, the data placement logic 102 places the blocks . . . , 120(p-2), 120(p-1), 120(p), and 120(p+1), . . . of the data stream 130(p) in the storage segment 150(n-1). Additionally, the data placement logic 102 places the blocks . . . , 120(q-2), 120(q-1), 120(q), and 120(q+1), of the data stream 130(q) in the storage segment 150(n). Furthermore, data placement logic 102 places the blocks . . . , 120(r-1), 120(r), and 120(r+1), . . . of the data stream 130(r) in the storage segment 150(n+1), and so on. Accordingly, each data stream 130 resides in a different segment 150 of storage.

When the data placement logic 102 fills a storage segment 150 with incoming blocks 120 of a particular stream, the data placement logic 102 moves to a new storage segment 150 for that particular stream rather than comingle the incoming blocks 120 of the particular stream with incoming blocks 120 of a different stream within a common segment 150. Accordingly, all incoming blocks 120 of a first data stream are placed in a set of first storage segments 150, all incoming blocks 120 of a second data stream are placed in a set of second storage segments 150, and so on. In some arrangements, the data placement logic 102 places all incoming blocks 120 that cannot be stream identified or that are general incoming blocks in a separate set of storage segments 150 (e.g., storage segments 150 that are assigned to a default stream or to general data).

It should be understood that the multiple storage segments . . . , 150(n-1), 150(n), 150(n+1), . . . may be the same size or different sizes. Furthermore, a variety of techniques are suitable for partitioning the storage provided by the array of storage devices 42 into the segments 150 (e.g., based on address, based on RAID group, based on RAID extent, based on device extent, etc.). In some arrangements, the various storage segments 150 are distributed across different storage tiers (e.g., a fast tier of solid state devices, a medium speed tier of SAS devices, a slow tier of near-line SAS devices, etc.).

As further shown in FIG. 4, the data placement logic 102 preserves the order of the data blocks 120 when placing the data blocks 120 within the storage segments 150. For example, the data placement logic 102 places the blocks . . . , 120(p-2), 120(p-1), 120(p), and 120(p+1), . . . of the data stream 130(p) within the segment 150(n-1) in the same order of arrival within the incoming flow of data 110 (also see FIG. 3). Such temporal order preservation leads to greater efficiency in subsequent operations (e.g., sequential reads, prefetching, promoting or demoting data to a different storage tier, etc.). Moreover, since this data (received around the same time and belonging to the same stream 130) is likely to be modified together if at all, such operation minimizes write amplification, fragmentation, garbage collection, and so on.

In some embodiments and as further shown in FIG. 5, the data placement logic 102 accesses a log 160 to capture storage details of the data placement operations. In particular, the data placement logic 102 stores, in temporal order, records 170 indicating when/where/which stream (e.g., stream ID) as well as other details regarding storage of the various blocks 120 of the streams 130 within the array of storage devices 42.

As shown in FIG. 5, the garbage collection logic 104 operates on the storage 140 provided by the array of storage devices 42. In particular, the garbage collection logic 104 combines remaining valid blocks 120 of data from partially used storage locations, and stores these valid blocks 120 in available storage locations (i.e., unused storage locations) thus improving storage efficiency and freeing the partially used storage locations for reuse.

As illustrated by the arrow 180, the garbage collection logic 104 accesses the records 170 from the log 160 to ascertain the location and order of the blocks 120 of the various data streams 130. Then, as illustrated by the arrow 190, the garbage collection logic 104 coalesces and re-places the valid blocks 120 of each stream 130 in respective storage locations keeping the blocks 120 of the individual streams 130 together in temporal order. For example, the garbage collection logic 104 combines remaining valid blocks 120 of the data stream 130(q) together and re-places them together within the storage 140 (also see FIG. 4). Similarly, the garbage collection logic 104 combines remaining valid blocks 120 of the data stream 130(q) together and re-places them together within the storage 140, and so on. As a result, blocks 120 of each stream 130 remain together in respective locations and the temporal order of the blocks 120 of each stream is preserved leading to improved efficiency in subsequent operations.

In some embodiments, the garbage collection logic 104 disables stream preservation on data after that data has sat idle or has been inactive for a predefined amount of time. For example, after the data of a first data stream 130 is placed in a first segment 150 of storage and the data of the second data stream 130 is placed in the second segment of storage 150, the garbage collection logic 104 waits for a predefined amount of time to expire. After the predefined amount of time has expired with the data remaining idle, garbage collection logic 104 provides a garbage collection service that combines and re-places the remaining valid data in the data storage array 42 regardless of the streams 130. Accordingly, at least some of the remaining valid data of the first data stream 130 and at least some of the remaining valid data of the second data stream 130 may reside together in a common segment 150 of the data storage array 42 after the amount of time has passed. Further details will now be provided with reference to FIG. 6.

Figure 6:
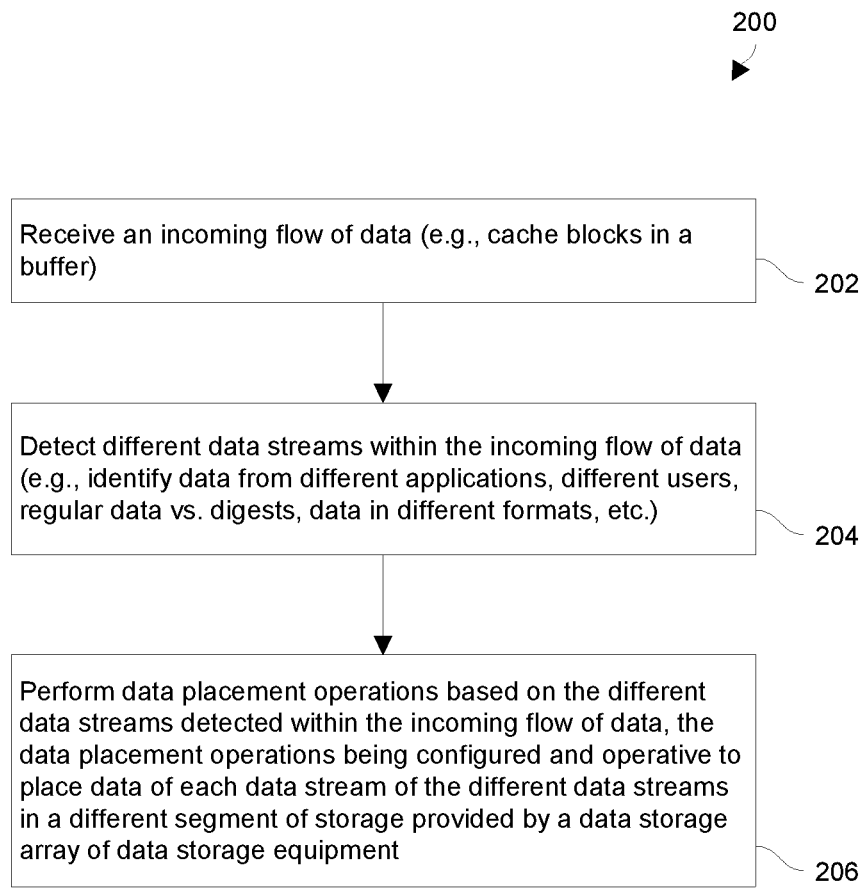
FIG. 6 is a flowchart of a data placement procedure which is performed by the data storage equipment of FIG. 2 in accordance with certain embodiments.

FIG. 6 is a flowchart of a procedure 200 which is performed by the storage processing circuitry 40 when providing stream-based storage of data. In some embodiments, the procedure 200 is performed in an inline manner as data is processed down the I/O path and is ultimately stored in secondary storage. In other embodiments, the procedure 200 is performed in an offline manner on data that is initially stored together (e.g., quickly to acknowledge write operations with minimal latency) but then processed again based on stream to optimize future operations that utilize the data.

At 202, the storage processing circuitry 40 receives an incoming flow of data. In some arrangements, the incoming flow of data is cached in main memory for processing by the I/O path.

At 204, the storage processing circuitry 40 detects different data streams within the incoming flow of data. Here, the storage processing circuitry 40 distinguishes data from different sources such as data from different host computer applications, different users, regular data vs. digest (used in deduplication), data in different formats, and so on.

At 206, the storage processing circuitry 40 performs data placement operations based on the different data streams detected within the incoming flow of data. The data placement operations are configured and operative to place data of each data stream of the different data streams in a different segment (or area) of storage provided by a data storage array of the data storage equipment.

As described above, improved techniques are directed to stream-based storage of data in which data placement operations are performed based on detection of different data streams 130 within an incoming flow of data 110. Such operation enables the data of each data stream 130 to be placed in a different segment (or location) 150 of secondary storage 140 provided by a data storage array 42. Since the data from each source 130 is kept together, the resulting operation is more efficient, e.g., optimized sequential reads and writes, improved data prefetching, improved auto-tiering of data, and so on.

One should appreciate that the above-described techniques do not merely store data in an abstract sense. Rather, the disclosed techniques involve improvements to the technology of data storage in that such technique provide better efficiency, operation, etc. For example, the techniques improve sequential reads and prefetching. Additionally, with the data of each stream being kept together, the data can be promoted and/or demoted to different storage tier thus providing data access more commensurate for the data stream. Furthermore, since this data is received around the same time and belongs to the same stream 130, the data is likely to be modified together if at all thus minimizing write amplification, reducing fragmentation, improving garbage collection results, and so on.

Further details of how the data storage equipment 24 (FIG. 1) identifies and handles inactive but still valid data will now be provided with reference to FIGS. 7 through 10. Along these lines, recall that, for log-based storage, data is written continuously to new storage segments 150 and the earlier versions of the data within older segments 150 are invalidated. Furthermore, any remaining valid data may be garbage collected (i.e., consolidated from the older segments 150 into new segments 150) to fully free the older segments 150 for reuse.

Figure 7:
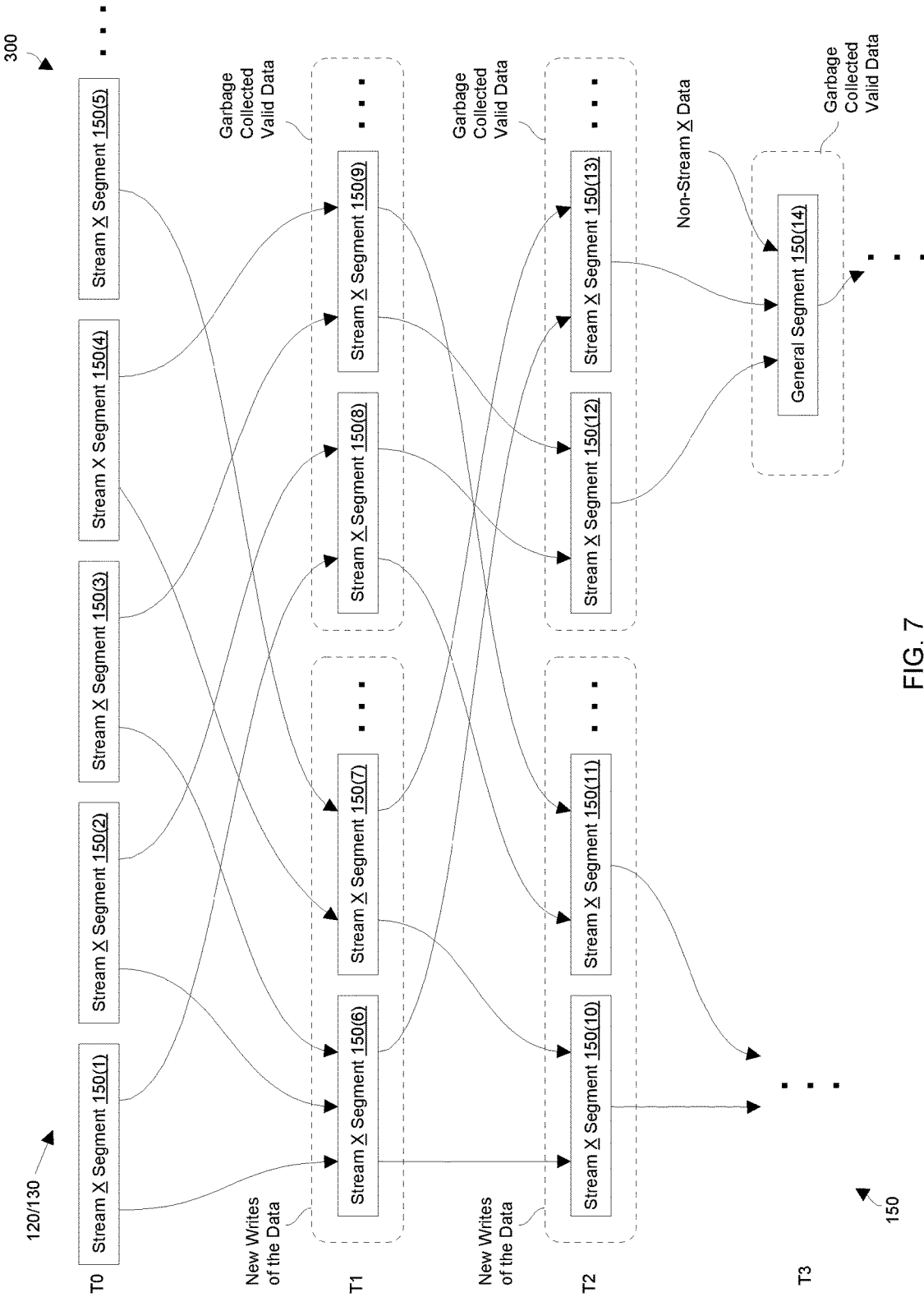
FIG. 7 is a block diagram illustrating placement of data of a particular data stream within segments that are different from other segments that hold data of one or more other data streams until the data of the particular data stream has become inactive in accordance with certain embodiments.

FIG. 7 is a diagram 300 showing placement of data blocks 120 of a particular data stream 130, i.e., stream X, from the incoming flow of data 110 (also see FIG. 3). In particular, the electronic circuitry 60 (FIG. 2) initially places the data blocks 120 of stream X within a set of storage segments 150(1), 150(2), 150(3), 150(4), 150(5), . . . that is different from other sets of storage segments 150 that hold data of other streams 130, e.g., see the top row of segments 150 showing the location of data blocks 120 of stream X at time T0. Accordingly, at this time T0, data access operations such as fetching, prefetching, deduplication, etc. enjoy particular efficiencies such as less fragmentation, lower latency, and so on.

During the course of operation, some of the stream X data within the segments 150 may be rewritten causing some of the initially placed data blocks 120 to become invalid. For illustration purposes only, at time T1 (the second row in FIG. 7), rewritten stream X data and perhaps new stream X data from the incoming flow of data 110 (FIG. 3) is placed in segments 150(6) and 150(7), and earlier versions of the stream X data within the segments 150(1), 150(2), 150(3), 150(4), 150(5) is invalidated. This operation by the electronic circuitry 60 is illustrated by the arrows from the segments 150(1), 150(2), 150(3), 150(4), 150(5) leading to the segments 150(6) and 150(7).

Additionally, at time T1, the remaining fragmented but still valid stream X data is consolidated and placed by the electronic circuitry 60 into segments 150(8) and 150(9). This garbage collection operation by the electronic circuitry 60 is illustrated by the arrows from the segments 150(1), 150(2), 150(3), 150(4), 150(5) leading to the segments 150(8) and 150(9).

At time T2 and as shown by the third row in FIG. 7, similar operations have been performed by the electronic circuitry 60. Here, the rewritten stream X data and perhaps new stream X data is placed in segments 150(10) and 150(11), and earlier versions of that data within the segments 150(1), 150(2), 150(3), 150(4), 150(5) are invalidated. Furthermore, garbage collected stream X data is consolidated and placed into segments 150(12) and 150(13). One should appreciate that some less active data that is in the original segments 150(1), 150(2), 150(3), 150(4), 150(5) or in the garbage collected segments 150(8) and 150(9) may be updated and placed in the segments 150(10) and 150(11) (e.g., see arrows leading from the segments 150(8) and 150(9) to the segments 150(10) and 150(11)).

It will be appreciated that, in contrast to the fresh stream X data that was just written into the segments 150(10) and 150(11), the stream X data within the segments 150(12) and 150(13) is less active (i.e., the stream X data within the segments 150(12) and 150(13) has been garbage collected multiple times). At some point (e.g., after fewer reads over time, after not reading the stream X data for a predefined amount of time, after garbage collecting the stream X data a predefined number of times, etc.), the storage processing circuitry 40 no longer places the stream X data into the segments 150 assigned to stream X. Rather, the storage processing circuitry 40 deems this data as belonging to a general or default stream that is stored in default segments 150 or simply disregards placing the stream X data within segments 150 based on stream.

Accordingly and as shown at time T3 in FIG. 7, the electronic circuitry 60 allows the stream X data to mingle with other non-stream X data. By way of example, the electronic circuitry 60 garbage collects the remaining valid data from storage segments 150(12) and 150(13) along with non-stream X data into the storage segment 150(14). Such operation is an improvement to the technology since overhead resources that performed placement based on the data belonging to the particular stream may now be redirected to perform other useful work. Further details will now be provided with reference to FIG. 8.

Figure 8:
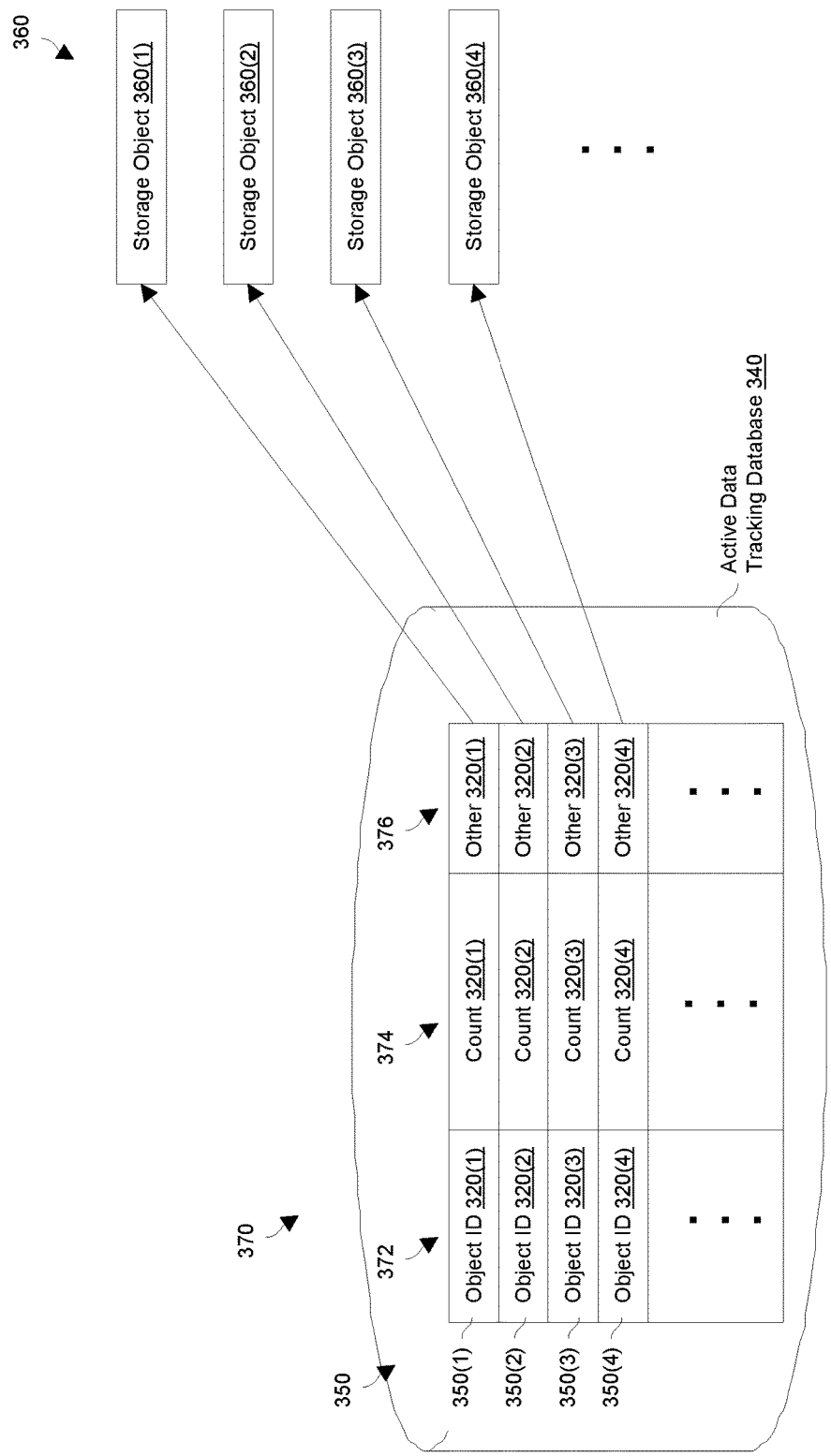
FIG. 8 is a block diagram of an active data tracking database in accordance with certain embodiments.

FIG. 8 shows an active data tracking database 340 that is utilized by the electronic circuitry 60 in accordance with certain embodiments. The active data tracking database 340 includes counter entries 350(1), 350(2), 350(3), 350(4), . . . (collectively, counter entries 350) that correspond to respective storage objects 360(1), 360(2), 360(3), 360(4), . . . (collectively, storage objects 360).

Each counter entry 350 includes multiple fields 370 such as an object identifier (ID) field 372, a count field 374, and one or more other fields 376. The object ID field 372 of each counter entry 350 holds an object identifier that uniquely identifies a particular storage object 360. The count field 374 of each counter entry 350 holds an access activity measure that indicates a level of access activity for the particular storage object 360 to determine whether data is still active or has become inactive. The other fields 376 of each counter entry 350 hold other information such as a timestamp indicating when the entry 350 was created, which data stream 130 the particular storage object belongs to, whether the particular object 360 holds host data 32 (FIG. 1) or metadata, and so on.

In some arrangements, the storage objects 360 are blocks 120 of data (also see FIG. 3) and each entry 350 stores a measure of access activity for a particular block 120. For example, the count field 374 of each entry 350 may hold the number of reads within a particular period of time that have been performed on the block 120 that is identified by that entry 350. As another example, the count field 374 of each entry 350 may hold the number of times the block 120 has been garbage collected, and so on. Eventually, the electronic circuitry 60 deems the block 120 to have become inactive (e.g., by the number of reads not exceeding a predefined threshold within a period of time, by the number of times the block 120 has been garbage collected exceeding a predefined threshold, etc.). Before the electronic circuitry 60 deems the block 120 inactive, the electronic circuitry 60 continues to place the block 120 within segments 150 based on stream. However, after the electronic circuitry 60 deems the block 120 inactive, the electronic circuitry 60 no longer performs placement of the block 120 based on streams and deletes the corresponding entry 350 from the active data tracking database 340.

In other arrangements, the storage objects 360 are segments 150 that hold data of a particular stream (also see FIG. 7) and each entry 350 stores a measure of access activity for a particular segment 150. For example, the count field 374 of each entry 350 may hold the number of reads of the data within a particular period of time from the particular segment 150 that is identified by that entry 350. As another example, the count field 374 of each entry 350 may hold the number of times the data within the particular segment 150 has been garbage collected, and so on. Eventually, the electronic circuitry 60 deems the data within the particular segment 150 to have become inactive (e.g., by the number of reads not exceeding a predefined threshold within a period of time, by the number of times the data within the particular segment 150 has been garbage collected exceeding a predefined threshold, etc.). Before the electronic circuitry 60 deems the data within the particular segment 150 inactive, the electronic circuitry 60 continues to perform data placement of that data based on stream. However, after the electronic circuitry 60 deems the block 120 inactive, the electronic circuitry 60 no longer performs data placement of that data based on stream and deletes the corresponding entry 350 from the active data tracking database 340. Further details will now be provided with reference to FIG. 9.

Figure 9:
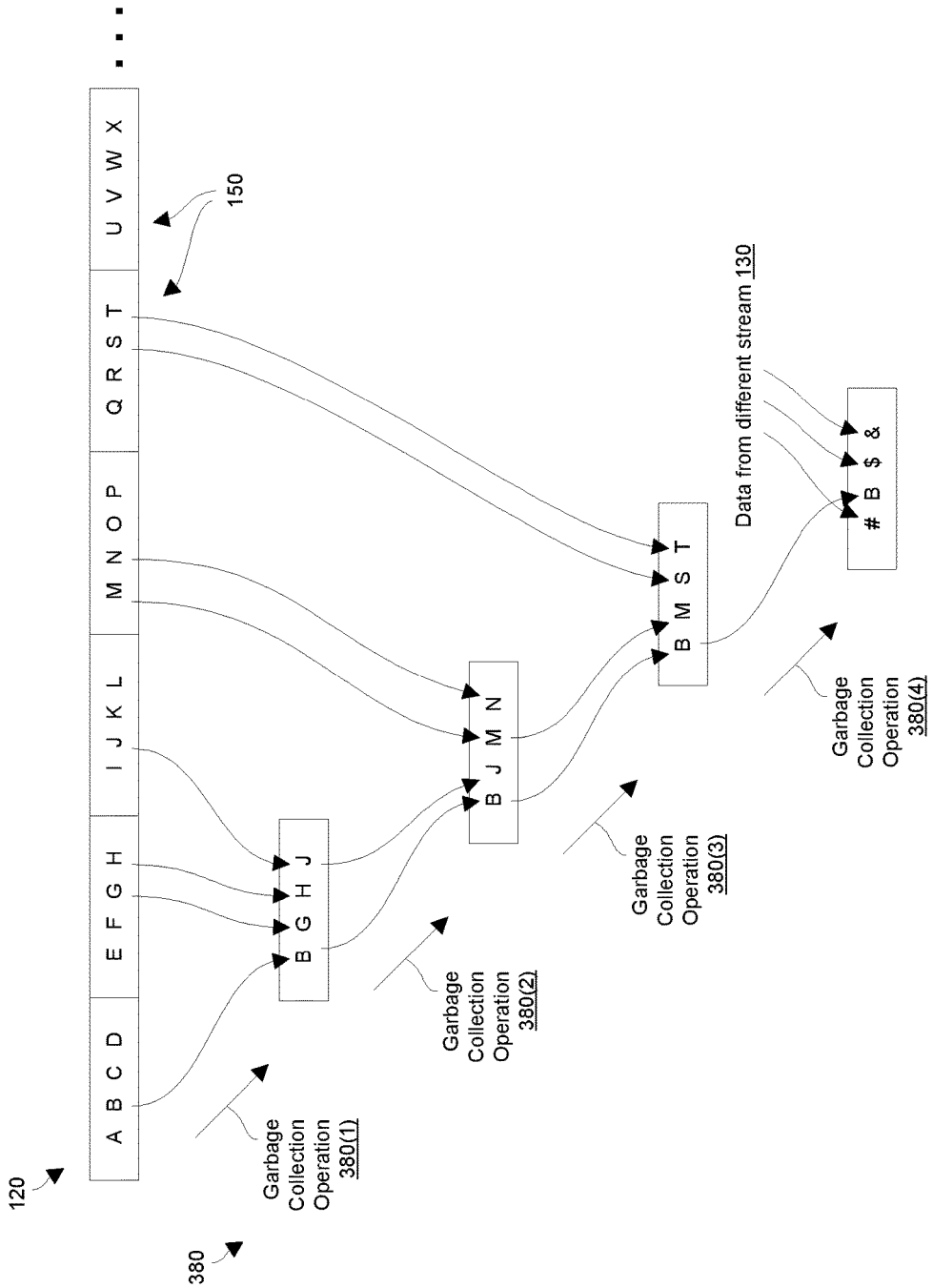
FIG. 9 is a block diagram of a particular data placement example in accordance with certain embodiments.

FIG. 9 shows, by way of example, a stream of data blocks A, B, C, . . . that the stream detection logic 100 (FIG. 3) has identified and the data placement logic 102 (FIG. 4) has placed in a set of storage segments 150 that only hold data blocks for that stream (also see the electronic circuitry 60 in FIG. 2). Concurrently, the stream detection logic 100 may identify other streams of data blocks, and the data placement logic 102 may place the other streams in other sets of storage segments 150.

Eventually, the garbage collection logic 104 (FIG. 5) performs stream based garbage collection. Along these lines, as the adjacent blocks of data 120 within the original segments 150 are invalidated, the garbage collection logic 104 combines the remaining valid data blocks of the stream together from the original segments 150 and places the remaining valid data blocks in new segments 150 with other valid data of the same stream. With the remaining data blocks now garbage collected into new segments 150, the garbage collection logic 104 invalidates the original data blocks in the original segments 150 thus freeing the original segments 150 for reuse.

As shown in FIG. 9, multiple garbage collection operations 380 are performed on a data block B. As the adjacent blocks are invalidated, the garbage collection logic 104 consolidates block B into new segments 150 with other valid data. During these operations, the garbage collection logic 104 updates the active data tracking database 340 (FIG. 8).

After the garbage collection logic 104 has garbage collected data block B a predefined number of times (e.g., 5 times, 10 times, 30 times, etc.), the garbage collection logic 104 considers data block B to be inactive. In FIG. 3, data block B is garbage collected 3 times before it is considered inactive. Such a determination may be made by comparing the counted number of times that block B was garbage collected (e.g., see the count fields 374 in the entries 350 of the database 340) to a predefined threshold.

Once the garbage collection logic 104 considers data block B to be inactive, the garbage collection logic 104 no longer performs stream based placement and may comingle data block B with data from other streams 130 (e.g., see garbage collection operation 380(4) in FIG. 9). As shown by way of example in the lowest segment 150 of FIG. 9, the data block B has been combined with one or more data blocks of one or more other streams 130 and/or with one or more blocks considered by the system to be general data. Additionally, the garbage collection logic 104 removes the entry 350 that identified data block B as active data thus allowing overhead resources to be reclaimed and applied to other tasks (e.g., tracking other active data blocks). Further details will now be provided with reference to FIG. 10.

Figure 10:
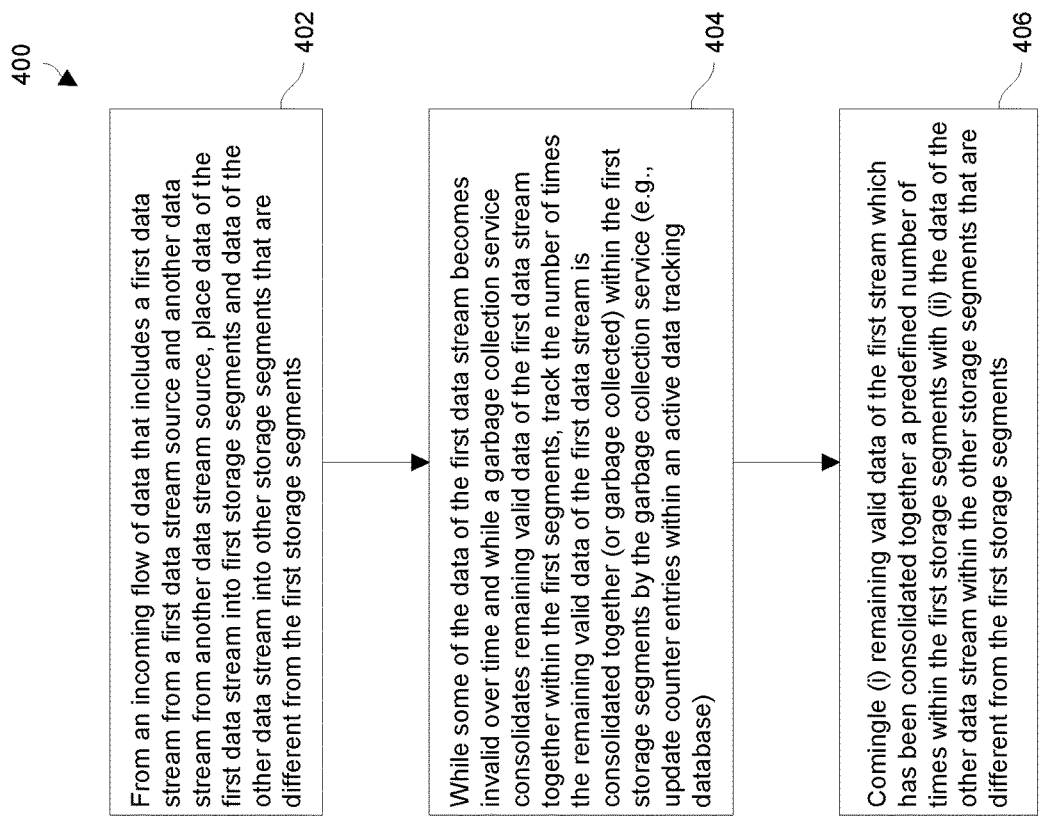
FIG. 10 is a flowchart of another data placement procedure which is performed by the data storage equipment of FIG. 2 in accordance with certain embodiments.

FIG. 10 shows a flowchart of a data placement procedure 400 which is performed by the data storage equipment 24 (FIG. 1) in accordance with certain embodiments. In particular, the data placement procedure 400 manages data placement based on streams.

At 402, from an incoming flow of data that includes a first data stream from a first data stream source and another data stream from another data stream source, the data storage equipment 24 places data of the first data stream into first storage segments and data of the other data stream into other storage segments that are different from the first storage segments.

At 404, while some of the data of the first data stream becomes invalidated over time and while a garbage collection service consolidates remaining valid data of the first data stream together within the first storage segments, the data storage equipment 24 tracks the number of times the remaining valid data of the first data stream is consolidated together within the first storage segments by the garbage collection service.

At 406, the data storage equipment 24 comingles (i) remaining valid data of the first data stream which has been consolidated together a predefined number of times within the first storage segments with (ii) the data of the other data stream within the other storage segments that are different from the first storage segments. Accordingly, data that has not been accessed for some period of time (e.g., data that has been garbage collected more than N times, for example) is considered to be inactive (and perhaps available for archiving, demoting to a lower tier, etc.). Accordingly, such data may now be treated as data that is general or that belongs to a default stream an no longer needs to be keep with the first storage segments that hold data for the first stream.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that, at least in some situations, the ability to detect the streams 130 (e.g., determining data that is related to other data because it is part of the same user object) and then store that data preserving stream and temporal localities provides significant benefits and advantages. Along these lines, data that is ingested together will be most likely accessed together after that. If the temporal and source related data can be placed together, it will increase the access speed, improve the cache efficiency, and enable more effective inline deduplication.

In accordance with some embodiments, improved electronic circuitry identifies the different streams within the flow of incoming blocks. The blocks from the same stream are grouped together and placed in a persistent place of the same segment (or window using the CBFS terminology).

To save information about the particular stream (and temporal order within the stream) the written data belongs to, the circuitry may utilize a log of written segments (windows). Such a log keeps the record describing the segment address on the media and stream it belongs to (also see FIGS. 4 and 5). Along these lines, the records are written in the log in the temporal order. It should be understood that, in some embodiments, the log is not required because the segments are written one following the other, so the natural order of the segments on the media represents the temporal order of the data arrival.

Additionally, in some embodiments, a garbage collector processes the data in the same order grouping the active data by stream and temporal localities. Accordingly, during space reclamation, localities are preserved as well. That is, the segments with collected data follow the same rules as in initial data placement, e.g., in temporal order of the arrival. The written segments are logged as well.

Furthermore, in some embodiments, the stream ID used in placing the data on SSD supports a streaming API. Such embodiments enable reduced write amplification, and enhanced endurance at least because the related data (with related life time) are grouped together.

Also, such history is collected for remaining valid data but is disregarded or deleted after some period of inactivity. This does not reduce the efficiency of the system significantly since data tends to eventually become inactive. Accordingly, all inactive data (data that has been idle for a predefined amount of time) may be considered as belonging to a dedicated archive stream 130.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In data storage equipment, a method of performing stream-based storage of data, the method comprising:
   from an incoming flow of data that includes a first data stream from a first data stream source and another data stream from another data stream source, placing data of the first data stream into first storage segments and data of the other data stream into other storage segments that are different from the first storage segments;

while some of the data of the first data stream becomes invalidated over time and while a garbage collection service consolidates remaining valid data of the first data stream together within the first storage segments, tracking the number of times the remaining valid data of the first data stream is consolidated together within the first storage segments by the garbage collection service; and comingling (i) remaining valid data of the first data stream which has been consolidated together a predefined number of times within the first storage segments with (ii) the data of the other data stream within the other storage segments that are different from the first storage segments; and wherein tracking the number of times the remaining valid data of the first data stream is consolidated together within the first storage segments by the garbage collection service includes:

updating counter entries within an active data tracking database, the counter entries identifying the number of times the remaining valid data of the first data stream has been consolidated together by the garbage collection service.

2. A method as in claim 1, further comprising:

while some of the data of the other data stream becomes invalidated over time and while the garbage collection service consolidates remaining valid data of the other data stream together within the other storage segments, updating other counter entries within the active data tracking database, the other counter entries identifying the number of times the remaining valid data of the other data stream has been consolidated together by the garbage collection service.

3. A method as in claim 2 wherein the other storage segments includes second storage segments that are different from the first storage segments;

wherein the data of the other data stream that is placed into the other storage segments includes data of a second data stream that is placed into the second storage segments that are different from the first storage segments; and wherein comingling the remaining valid data of the first data stream with the data of the other data stream within the other storage segments includes:

combining the remaining valid data of the first data stream which has been consolidated together the predefined number of times within the first storage segments with remaining valid data of the second data stream which has been consolidated together at least the predefined number of times within the second storage segments.

4. A method as in claim 3 wherein the first data stream and the second data stream are initially interleaved within the incoming flow of data; and wherein combining includes:

coalescing blocks of the first data stream with blocks of the second data stream within third storage segments that are different from the first storage segments and the second storage segments.

5. A method as in claim 4 wherein the first storage segments reside in a first storage tier; and wherein the third storage segments reside in a second storage tier that provides slower data access than that of the first storage tier.

6. A method as in claim 3 wherein the first data stream and the second data stream are initially interleaved within the incoming flow of data; and wherein combining includes:

coalescing blocks of the first data stream with blocks of the second data stream within the second storage segments that are different from the first storage segments.

7. A method as in claim 6 wherein the first storage segments reside in a first storage tier; and wherein the second storage segments reside in a second storage tier that provides slower data access than that of the first storage tier.

8. A method as in claim 2, further comprising:

in response to comingling the remaining valid data of the first data stream which has been consolidated together the predefined number of times with the data of the other data stream within the other storage segments, deleting particular counter entries from the active data tracking database, the particular counter entries having counted the number of times that the remaining valid data of the first data stream had been consolidated together.

9. A method as in claim 8 wherein comingling the remaining valid data of the first data stream which has been consolidated together the predefined number of times with the data of the other data stream within the other storage segments includes:

moving the remaining valid data of the first data stream which has been consolidated together the predefined number of times from faster storage within secondary memory to slower storage within secondary memory.

10. A method as in claim 1, further comprising:

identifying, from the remaining valid data of the first data stream, hotter data which has been read within a predefined amount of time and colder data which has not been read within the predefined amount of time; and wherein comingling the remaining valid data of the first data stream which has been consolidated together the predefined number of times with the data of the other data stream includes:

combining the colder data with the data of the other data stream while deferring combining the hotter data with the data of the other data stream.

11. A method as in claim 10 wherein the data storage equipment is operative to store data within tiered storage;

wherein remaining valid data of the first data stream which has been consolidated together less than the predefined number of times resides within a first storage tier of the tiered storage;

wherein the hotter data resides within a second storage tier of the tiered storage, the second storage tier providing slower data access than the first storage tier; and wherein the colder data resides within a third storage tier of the tiered storage, the third storage tier providing slower data access than the second storage tier.

12. In data storage equipment, a method of performing stream-based storage of data, the method comprising:

from an incoming flow of data that includes a first data stream from a first data stream source and another data stream from another data stream source, placing data of the first data stream into first storage segments and data of the other data stream into other storage segments that are different from the first storage segments;

while some of the data of the first data stream becomes invalidated over time and while a garbage collection service consolidates remaining valid data of the first data stream together within the first storage segments, tracking the number of times the remaining valid data of the first data stream is consolidated together within the first storage segments by the garbage collection service;

comingling (i) remaining valid data of the first data stream which has been consolidated together a predefined number of times within the first storage segments with (ii) the data of the other data stream within the other storage segments that are different from the first storage segments; and identifying, from the remaining valid data of the first data stream, hotter data which has been read within a predefined amount of time and colder data which has not been read within the predefined amount of time; and wherein comingling the remaining valid data of the first data stream which has been consolidated together the predefined number of times with the data of the other data stream includes:

combining the colder data with the data of the other data stream while deferring combining the hotter data with the data of the other data stream.

13. A method as in claim 12 wherein the data storage equipment is operative to store data within tiered storage;

wherein remaining valid data of the first data stream which has been consolidated together less than the predefined number of times resides within a first storage tier of the tiered storage;

wherein the hotter data resides within a second storage tier of the tiered storage, the second storage tier providing slower data access than the first storage tier; and wherein the colder data resides within a third storage tier of the tiered storage, the third storage tier providing slower data access than the second storage tier.

14. Data storage equipment, comprising:
a communications interface;
memory; and
control circuitry coupled to the communications interface and the memory, the memory storing instructions which, when carried out by the control circuitry, cause the control circuitry to:

from an incoming flow of data received through the communications interface that includes a first data stream from a first data stream source and another data stream from another data stream source, place data of the first data stream into first storage segments and data of the other data stream into other storage segments that are different from the first storage segments, while some of the data of the first data stream becomes invalidated over time and while a garbage collection service consolidates remaining valid data of the first data stream together within the first storage segments, track the number of times the remaining valid data of the first data stream is consolidated together within the first storage segments by the garbage collection service, and comingle (i) remaining valid data of the first data stream which has been consolidated together a predefined number of times within the first storage segments with (ii) the data of the other data stream within the other storage segments that are different from the first storage segments; and wherein the control circuitry, when tracking the number of times the remaining valid data of the first data stream is consolidated together within the first storage segments by the garbage collection service, is operative to:

update counter entries within an active data tracking database, the counter entries identifying the number of times active data of the first data stream has been consolidated together by the garbage collection service.

15. Data storage equipment as in claim 14 wherein the control circuitry is further constructed and arranged to:

identify, from the remaining valid data of the first data stream, hotter data which has been read within a predefined amount of time and colder data which has not been read within the predefined amount of time; and wherein the control circuitry, when comingling the remaining valid data of the first data stream which has been consolidated together the predefined number of times with the data of the other data stream, is constructed and arranged to:

combine the colder data with the data of the other data stream while deferring combining the hotter data with the data of the other data stream.

16. Data storage equipment as in claim 15 wherein the data storage equipment is operative to store data within tiered storage;

wherein remaining valid data of the first data stream which has been consolidated together less than the predefined number of times resides within a first storage tier of the tiered storage;

wherein the hotter data resides within a second storage tier of the tiered storage, the second storage tier providing slower data access than the first storage tier; and wherein the colder data resides within a third storage tier of the tiered storage, the third storage tier providing slower data access than the second storage tier.

17. A computer program product having a non-transitory computer readable medium which stores a set of instructions to perform stream-based storage of data; the set of instructions, when carried out by computerized circuitry, causing the computerized circuitry to perform a method of:

from an incoming flow of data that includes a first data stream from a first data stream source and another data stream from another data stream source, placing data of the first data stream into first storage segments and data of the other data stream into other storage segments that are different from the first storage segments;

while some of the data of the first data stream becomes invalidated over time and while a garbage collection service consolidates remaining valid data of the first data stream together within the first storage segments, tracking the number of times the remaining valid data of the first data stream is consolidated together within the first storage segments by the garbage collection service; and comingling (i) remaining valid data of the first data stream which has been consolidated together a predefined number of times within the first storage segments with (ii) the data of the other data stream within the other storage segments that are different from the first storage segments; and wherein tracking the number of times the remaining valid data of the first data stream is consolidated together within the first storage segments by the garbage collection service includes:

updating counter entries within an active data tracking database, the counter entries identifying the number of times active data of the first data stream has been consolidated together by the garbage collection service;

identifying, from the remaining valid data of the first data stream, hotter data which has been read within a predefined amount of time and colder data which has not been read within the predefined amount of time; and wherein comingling the remaining valid data of the first data stream which has been consolidated together the predefined number of times with the data of the other data stream includes:

combining the colder data with the data of the other data stream while deferring combining the hotter data with the data of the other data stream.

18. A computer program product as in claim 17 wherein the method further comprises:

identifying, from the remaining valid data of the first data stream, hotter data which has been read within a predefined amount of time and colder data which has not been read within the predefined amount of time; and wherein comingling the remaining valid data of the first data stream which has been consolidated together the predefined number of times with the data of the other data stream includes:

combining the colder data with the data of the other data stream while deferring combining the hotter data with the data of the other data stream.

19. Data storage equipment, comprising:

a communications interface;

memory; and control circuitry coupled to the communications interface and the memory, the memory storing instructions which, when carried out by the control circuitry, cause the control circuitry to:

from an incoming flow of data received through the communications interface that includes a first data stream from a first data stream source and another data stream from another data stream source, place data of the first data stream into first storage segments and data of the other data stream into other storage segments that are different from the first storage segments, while some of the data of the first data stream becomes invalidated over time and while a garbage collection service consolidates remaining valid data of the first data stream together within the first storage segments, track the number of times the remaining valid data of the first data stream is consolidated together within the first storage segments by the garbage collection service, comingle (i) remaining valid data of the first data stream which has been consolidated together a predefined number of times within the first storage segments with (ii) the data of the other data stream within the other storage segments that are different from the first storage segments, and identify, from the remaining valid data of the first data stream, hotter data which has been read within a predefined amount of time and colder data which has not been read within the predefined amount of time; and wherein the control circuitry, when comingling the remaining valid data of the first data stream which has been consolidated together the predefined number of times with the data of the other data stream, is constructed and arranged to:

combine the colder data with the data of the other data stream while deferring combining the hotter data with the data of the other data stream.

20. A computer program product having a non-transitory computer readable medium which stores a set of instructions to perform stream-based storage of data; the set of instructions, when carried out by computerized circuitry, causing the computerized circuitry to perform a method of:

from an incoming flow of data that includes a first data stream from a first data stream source and another data stream from another data stream source, placing data of the first data stream into first storage segments and data of the other data stream into other storage segments that are different from the first storage segments;

while some of the data of the first data stream becomes invalidated over time and while a garbage collection service consolidates remaining valid data of the first data stream together within the first storage segments, tracking the number of times the remaining valid data of the first data stream is consolidated together within the first storage segments by the garbage collection service;

comingling (i) remaining valid data of the first data stream which has been consolidated together a predefined number of times within the first storage segments with (ii) the data of the other data stream within the other storage segments that are different from the first storage segments; and identifying, from the remaining valid data of the first data stream, hotter data which has been read within a predefined amount of time and colder data which has not been read within the predefined amount of time; and wherein comingling the remaining valid data of the first data stream which has been consolidated together the predefined number of times with the data of the other data stream includes:

combining the colder data with the data of the other data stream while deferring combining the hotter data with the data of the other data stream.

* * * * *